United States Patent
Schübel et al.

[11] Patent Number: 5,397,898
[45] Date of Patent: Mar. 14, 1995

[54] OPTICAL COMPONENT EXCHANGER AND METHOD

[75] Inventors: Reiner Schübel; Arno Simon, both of Karlsruhe, Germany

[73] Assignee: Bruker Analytische Messtechnik GmbH, Rheinstetten, Germany

[21] Appl. No.: 190,634

[22] Filed: Feb. 2, 1994

[51] Int. Cl.⁶ .................... H01J 5/02; G02B 27/00
[52] U.S. Cl. ................ 250/339.01; 359/895; 250/340
[58] Field of Search .............. 250/339.01, 340, 347, 250/353, 239; 378/34; 359/513, 514, 895; 356/326, 319

[56] References Cited
U.S. PATENT DOCUMENTS

| | | | |
|---|---|---|---|
| 4,786,143 | 11/1988 | Veal et al. | 359/896 |
| 5,175,717 | 12/1992 | Saimi et al. | 359/513 |
| 5,198,664 | 3/1993 | Fayfield | 250/339 |

*Primary Examiner*—Paul M. Dzierzynski
*Assistant Examiner*—Richard Hanig
*Attorney, Agent, or Firm*—Cesari and McKenna

[57] ABSTRACT

An apparatus and a method for the exchange of an optical component 20 is proposed in which a storage housing 1 exhibits a lower opening with a first gate means 21 adapted for sealing the lower opening. A second stopping means 6 attached to a driving means 5 and a first stop attached to the storage housing 1 are adapted to assume two states, a first state in which a optical component 20 is completely within the storage housing 1, and a second state in which an optical component 20 is completely removed from the storage housing 1. A pivoted mounting 4 of a lifting means 2 onto the driving means 5 in combination with a rotation of said driving means 5 allows for the force of gravity to guide the removal and introduction of the optical component 20 out of and into a spectrometer housing 24.

10 Claims, 5 Drawing Sheets

OPTICAL COMPONENT EXCHANGER AND METHOD

BACKGROUND OF THE INVENTION

The invention concerns an optical component exchanger and a method for exchanging an optical component in particular of an infrared spectrometer.

An apparatus and a method of this kind are known in the art from the research grade vacuum FT (fourier transform) IR (infrared) spectrometer produced by Bio-Rad Digilab Division of Cambridge, Mass., USA. The known spectrometer system exhibits a vacuum infrared spectrometer in particular for spectroscopy in the far infrared (600 to 10 $cm^{-1}$). The system includes a set of mylar beam-splitters as well as a metal mesh beam-splitter to give a wide coverage of the entire far IR range. The beam-splitters are easily positioned and require minimal change-over time. A simple glove box arrangement is utilized to exchange the beam-splitters without opening the optical system to atmosphere.

The known optical exchange apparatus has the disadvantage that the process of exchanging the optical component must essentially be carried out by hand using a bulky glove box arrangement. Moreover once the optical component is removed, the storage of said component must be carried out within the glove box or subsequent transfer of the component to a separate storage facility must be undertaken. This, in turn, requires additional operational steps and increases the time and consequently the related expense associated with the exchange procedure.

It is therefore the purpose of the present invention to present an exchange apparatus for an optical component, in particular a component of a FT-IR spectrometer, which allows for a simple and efficient exchange of the optical component without having the component exposed to the ambient atmosphere.

SUMMARY OF THE INVENTION

This purpose is achieved by an apparatus for the exchange of an optical component comprising a storage housing means having a lower opening, a first gate means adapted for sealing the lower opening and a first stopping means, the apparatus also comprising a driving means pivotably mounted to the housing means having second stopping means and a pivot means and a lifting means is rotatably mounted to the pivot means, the lifting means having attachment means at a first end, whereby a stored optical component positioned in the housing means with a first gate means sealing the storage housing opening is suspended from the attachment means with the driving means rotated to secure the lifting means between the first and the second stopping means.

In this fashion the purpose of the invention is completely achieved. By utilizing a storage housing having a lower opening with a sealing gate means and exhibiting the appropriate lifting and driving means, it is possible to introduce the storage housing means onto, for example, an FT spectrometer housing to open said housing not to the external atmosphere but rather to the internal portions of the storage housing means only. In this fashion, the lifting means can be extended outwardly and downwardly from the storage housing means into the spectrometer housing to engage the exchangeable optical component and to lift this optical component out of the spectrometer housing and into the storage housing. In this fashion the exchange operation is performed without exposing the exchanged optical component to the ambient atmosphere and also without having to expose the inside of the FT spectrometer to said ambient atmosphere.

In an important embodiment of the invention a spectrometer housing means exhibits an upper opening and a second gate means which is adapted for sealing the upper opening and which engages the first gate means of the storage housing means and a component lock means is located within the spectrometer housing which engages the second gate means and is adapted to lock the exchange optical component within the housing means when said second gate means seal the upper opening.

This embodiment has the advantage that the first gate means of the storage housing means and the second gate means of the spectrometer housing means engage each other so that both gates of the storage housing and of the spectrometer housing are simultaneously opened. The integration of the second gate means with the component lock means allows for simultaneous release of the exchanged optical component when the second gate and first gate means are opened. Conversely, after having introduced a stored optical component from the storage housing into the spectrometer housing by the inverse method steps or operation of the apparatus, the subsequent closing of the first and second gate means locks, through engagement of the component lock means with the second gate means, the exchanged optical component into the spectrometer housing.

An embodiment of the invention configures the geometry and the relative locations of the storage housing means, the driving means and the lifting means in such a fashion that, prior to access of an exchanged optical component into the storage housing means, the first gate means seals the lower opening of the storage housing while the driving means are rotated to a position where the first and second stopping means are in mutual contact, whereby the lifting means hangs freely vertically down from the pivot means.

This embodiment has the advantage that an extremely simple mechanical configuration of the optical component exchanger is realized which allows the lifting means to retract into the storage housing means prior to engagement of said means into the spectrometer housing for the purpose of exchanging an optical component. In this fashion the environment within the storage housing means remains sealed to the ambient atmosphere so that dust and moisture are prevented from entering into the storage housing means. Upon engaging the storage housing with the spectrometer housing and opening the first and second gates, the geometry of the invention allows for the lowering of the lifting means down into the spectrometer housing to engage the exchanged optical component and by continued rotation of the driving means to lift said component out of the spectrometer housing without exposing the component, the spectrometer housing, and the storage housing to the ambient atmosphere.

In a particular embodiment of the invention the storage housing means comprises a component window means adapted for enabling viewing of the stored optical component as well as an in-window means which is adapted for enabling viewing of a first end of the lifting means at an in-location of the stored optical component as well as an out-window means adapted for enabling viewing of a second end of the lifting means at an out-location of the stored optical component.

This embodiment has the advantage that operator viewing of the status of the exchange procedure as well as the nature of the component being exchanged is facilitated whereby the precise state of the exchange procedure can be monitored in a simple and safe fashion.

In a particularly important embodiment of the invention, the stored optical component is a beam-splitter for an infrared spectrometer.

This embodiment has the advantage that beam-splitters for infrared spectrometers can be exchanged without exposed to the ambient atmosphere including dust and moisture. Fourier infrared spectrometers, including those operating in the far infrared range, require the use of a multitude of beam-splitters, each of which is adapted for operation within a specific spectral region. When operating a spectrometer over a large spectral range, exchange of these beam-splitters is thereby necessitated. Many of these beam-splitters are, however, hydroscopic or otherwise sensitive to dust and moisture as are other optical components of the spectrometer so that exchange of said components without exposure to the ambient atmosphere is necessary.

In a further embodiment of the invention the apparatus further comprises a driving means lock to engage the driving means which is adapted to lock rotation of said driving means.

This embodiment has the advantage that the driving means cannot freely rotate so that danger of inadvertently dropping or damaging the exchanged optical component is minimized.

In an embodiment of the invention the storage housing means is adapted to include a desiccant means which can be exchanged.

This variation has the advantage that hydroscopic optical components can be maintained in a dry environment within the storage housing.

In an embodiment of the invention wherein the storage housing means comprise an in- and an out-window means for enabling viewing of the first and second ends of the lifting means, the first lifting means end exhibits a first color and the second lifting means end has a second color.

This embodiment has the advantage that a color coding of the exchanged state of the exchange apparatus can be easily seen by viewing through the window means of the storage housing. For example, one end could be painted or colored green to indicate a go-state and the other end red to indicate a stop condition.

In a preferred manifestation of the invention the gate means are made from a material adapted for sliding with low friction.

This manifestation has the advantage that by making the gate means from a material sliding with low friction such as nylon, the opening and closing of the lower opening of the storage housing means and/or the upper opening of the spectrometer housing means can be easily carried out.

The purpose according to the invention is also accomplished by a method for exchanging an optical component of a spectrometer. This method comprises the steps of opening a first gate in a storage housing, opening a second gate in a spectrometer housing, unlocking a component lock to unlock an exchange optical component within the spectrometer housing, rotating a driving means to lower a lifting means from the storing housing into the spectrometer housing, further rotating the driving means to engage an attachment means on a first end of the lifting means with the exchange component to lift the component, further rotating the driving means to rotate the first end upwardly into the storage housing, whereby the exchange component is contained within the storage housing, closing the first gate to seal the first storage housing, and closing the second gate to seal the spectrometer housing.

By means of this method, the purpose of the invention is completely accomplished. The steps including the usage of a spectrometer housing and a storage housing which allow for the lowering of the lifting means, initially contained completely within the storage housing, downward from the storage housing into the spectrometer housing in order to engage and lift, with one rotating motion, the exchanged optical component thereby removing said component from the spectrometer and lifting it into the storage housing by continued rotation of the driving means. In this fashion the exchanged procedures effected using a series of steps which are extremely simple and include the mere rotation of a driving means. This rotation can be carried out by hand or through use of an automatic driver, such as an electric motor. The entire method can only be carried out with the apparatus according to the invention. However, that apparatus can be automated to be driven by electric motors or by hand.

Further advantages and features of the invention can be extracted from the accompanying drawings and the associated descriptions thereof. Clearly all features of the drawings can be used individually or collectively in arbitrary combination without departing from the intended framework of the invention.

DESCRIPTION OF THE PREFERRED EMBODIMENT

Figure 1:
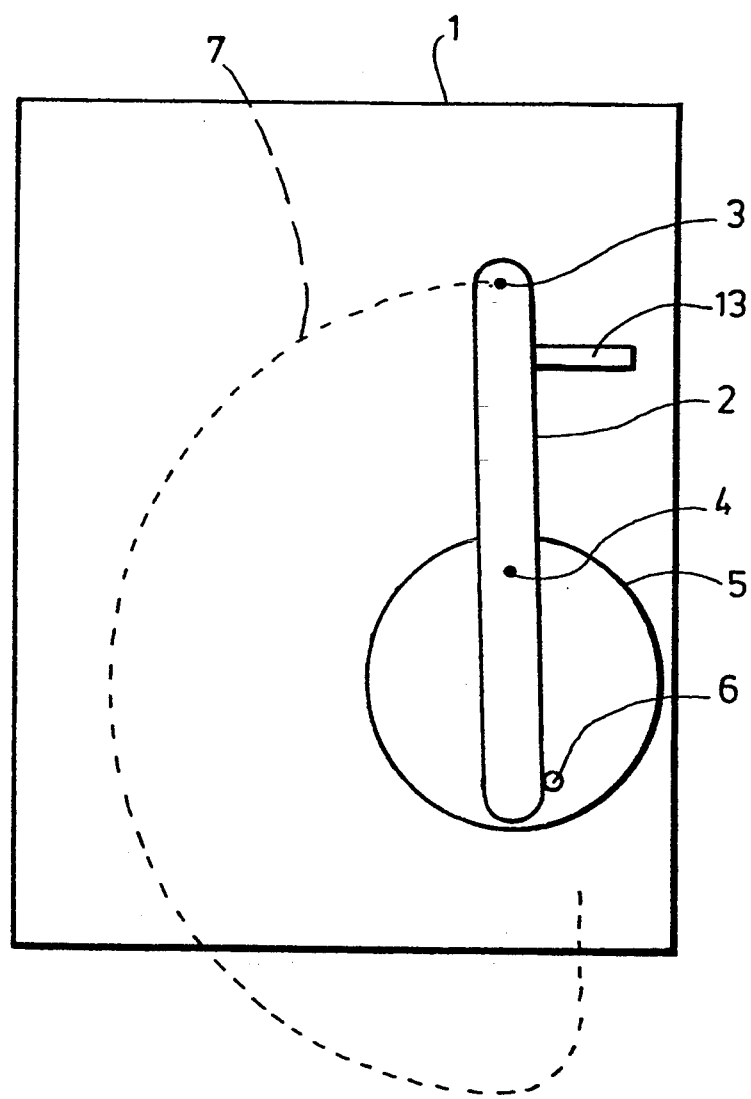
FIG. 1 shows a schematic diagram of the principle of operation of-the invention having the lifting means contained within the storage compartment in a fashion adapted for lowering the stored optical component out of the storage housing.

FIG. 1 shows a schematic principle of operation of the method and apparatus in accordance with the invention in which a particular state of the lifting system is shown. A storage housing 1 contains a lifting means 2 which is adapted by means of a pivot 4 to be attached to a driving means 5. The lifting means further exhibits an attachment means 3. The driving means 5 has a second stop 6 which is rigidly attached to the driving means 5, and the storage housing 1 has a first stop 13 rigidly attached to the storage housing 1. The driving means 5 are rotatably secured to the storage housing 1 such that, through a rotation of said driving means 5, the pivot point 4 at which the lifting means 2 is secured to the driving means 5 begins to rotate along with the rotation of the driving means 5. In the position shown in FIG. 1 the end of the lifting means 2 which is located opposite to the attachment means 3 is securely located between the first stop 13 of the spectrometer housing 1 and the second stop 6 of the driving means 5. In this position, a stored optical component (not shown) suspended from the attachment means 3, is securely located within the storage housing at a reproduceable geometrical location.

Should the driving means 5 be rotated in a counter-clockwise fashion, the point described by the attachment means 3 describes a path 7 during the rotation. Should an optical component be suspended from the attachment means 3, the force of gravity tends to rotate the lifting means 2 about the pivot 4 to urge the lifting means 2 against the second stop 6.

Figure 2:
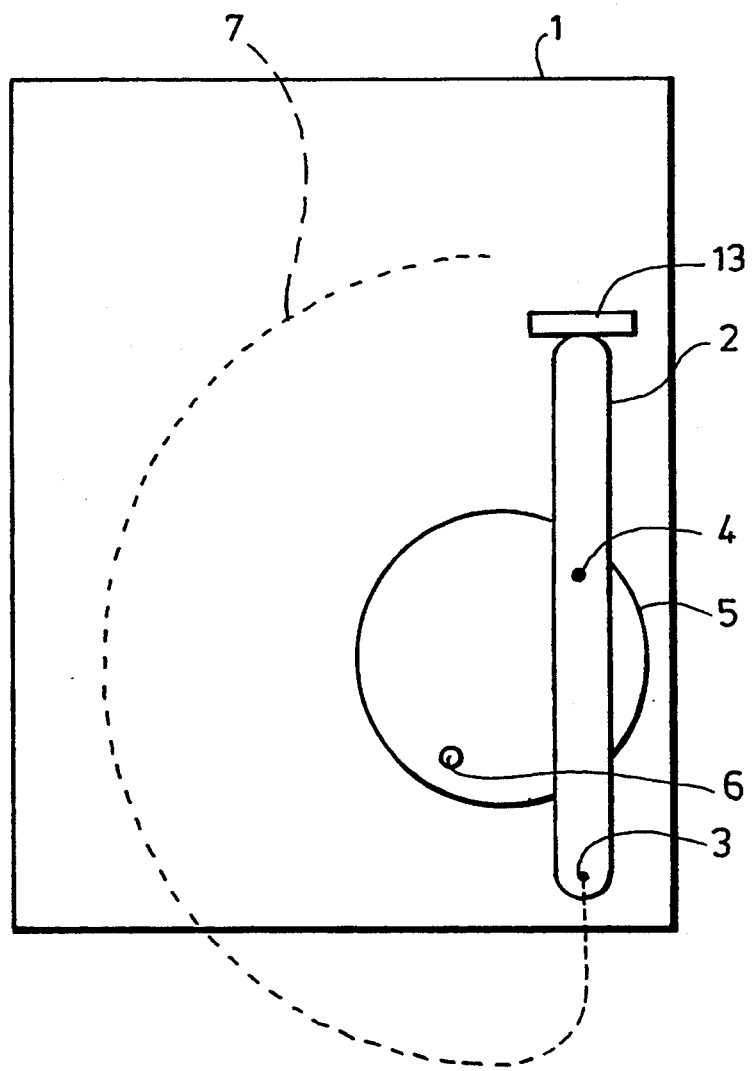
FIG. 2 shows a second state of use of the invention in which the lifting means has been rotated to a position appropriate for the start of a process in which the exchanged optical component is to be lifted out of its location in a spectrometer housing and into the storage housing.

FIG. 2 shows the geometry of the storage housing 1 in one embodiment by which the driving means 5 has been completely rotated counter-clockwise until the lifting means 2 firmly abuts the first stop 13. As the driving means 5 is rotated from the position corresponding to FIG. 1 to that corresponding to FIG. 2, the attachment means 3 describes a path 7. As the driving means 5 is rotated from the position of FIG. 1 to that of FIG. 2, a stored optical component (not shown) suspended from the attachment 3 is lowered out of the storage housing 1 into, for example, a spectrometer housing (not shown) and caused to be freed from its suspension on attachment means 3 when the attachment means 3 assume their maximum extension outside the storage housing 1 indicated by the C-shaped dotted line of path 7. At this minimum point, the stored optical component is freed from its attachment and the continued rotation of driving means 5 results in the withdrawal of the lifting means upward and back into the storage housing 1 as the lifting means pivots freely under the force of gravity about the pivot 4 on the driving means 5.

Figure 3:
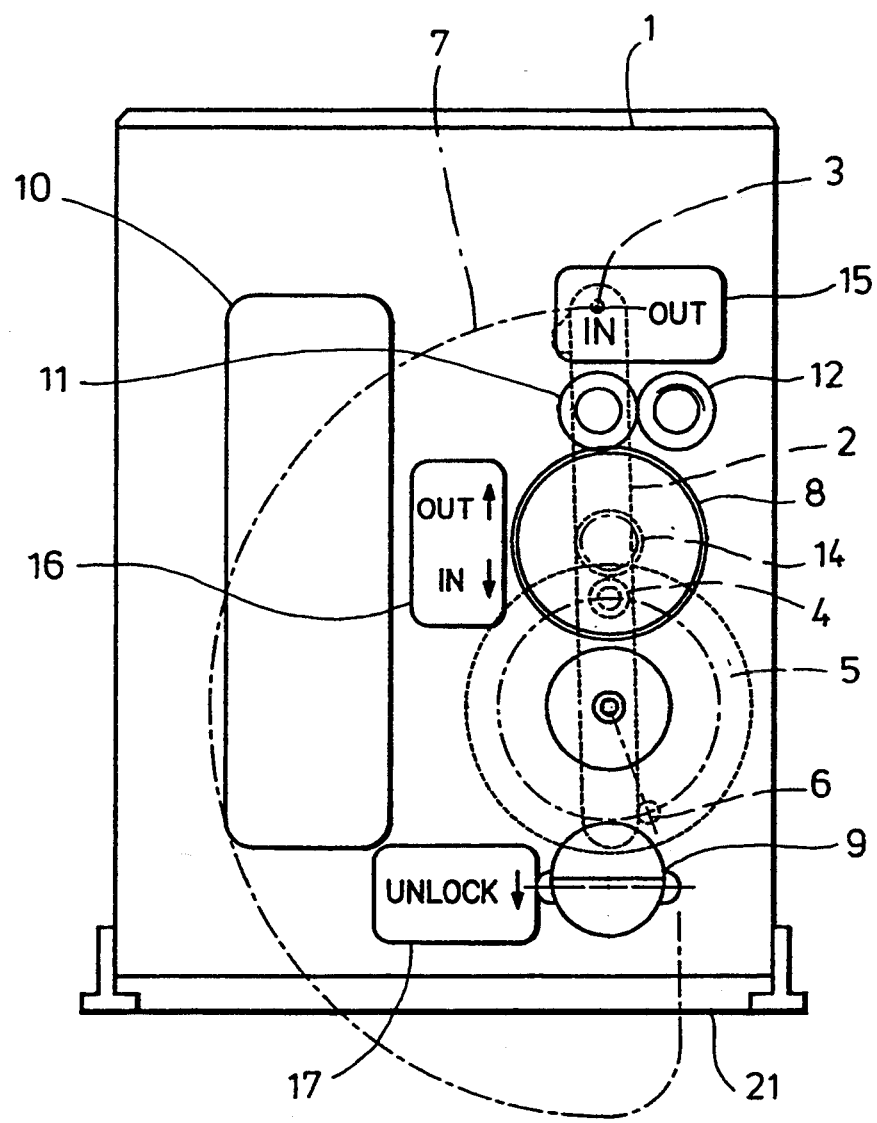
FIG. 3 shows a more detailed view of the schematic representation of FIG. 1 indicating additional features of the inventive storage housing.

FIG. 3 details further features of the invention. A knob 8 is secured to the storage housing 1 and engages the driving means 5 to cause rotation of said means 5 when knob 8 is rotated. Rotation of knob 8 can be carried out by hand or by means of automation, for example, with an electric motor. Also shown in FIG. 3 is a driving means lock 9 which engages the driving means 5 to lock driving means 5 against rotation. Driving means lock 9 can be configured in such a fashion that the driving means 5 can only be rotated when driving means lock 9 is pressed downward and held downward as indicated by third label 17 of FIG. 3. The storage housing 1 exhibits a storage housing gate 21 at the bottom of the housing 1 which is adapted to slide outwards to open the bottom of the housing 1. A second label 16 can be attached to the housing 1 in order to indicate the sense of rotation of the knob 8 in order to remove an optical component from, for example, a spectrometer or to insert said component into the spectrometer. Towards this end, knob 8 can exhibit a knob gear 14 adapted to engage driving means 5 to effect the required rotation. In addition, the spectrometer housing 1 can exhibit an in-window 11 and an out-window 12 adapted to provide viewing of a first end of the lifting means 2 when the driving means 5 are positioned in a position in which the stored optical component is within the storage housing 1. A second out-window 12 is geometrically adapted to view the opposite end of the lifting means 2 when the driving means 5 are rotated in the counter-clockwise direction such that the configuration of FIG. 2 obtains. Therefore the in-window 11 corresponds to the configuration of FIG. 1 and the out-window 12 corresponds to the configuration of FIG. 2. Should the lifting means 2 be color coded so that the end of the lifting means 2 are visible in the in-window 11 is colored one color and the lifting means 2 end visible in the out-window 12 another color, whereby the colors can be green and red, an immediate-visual indication of the status of the storage system is given to the user in a convenient and economical fashion. A first label 15 can be utilized to label the in-window 11 and the out-window 12. The storage housing 1 further exhibits a component window 10 which allows viewing of a storage component within the storage housing 1 for identification of the storage component and monitoring of its storage status.

Figure 4:
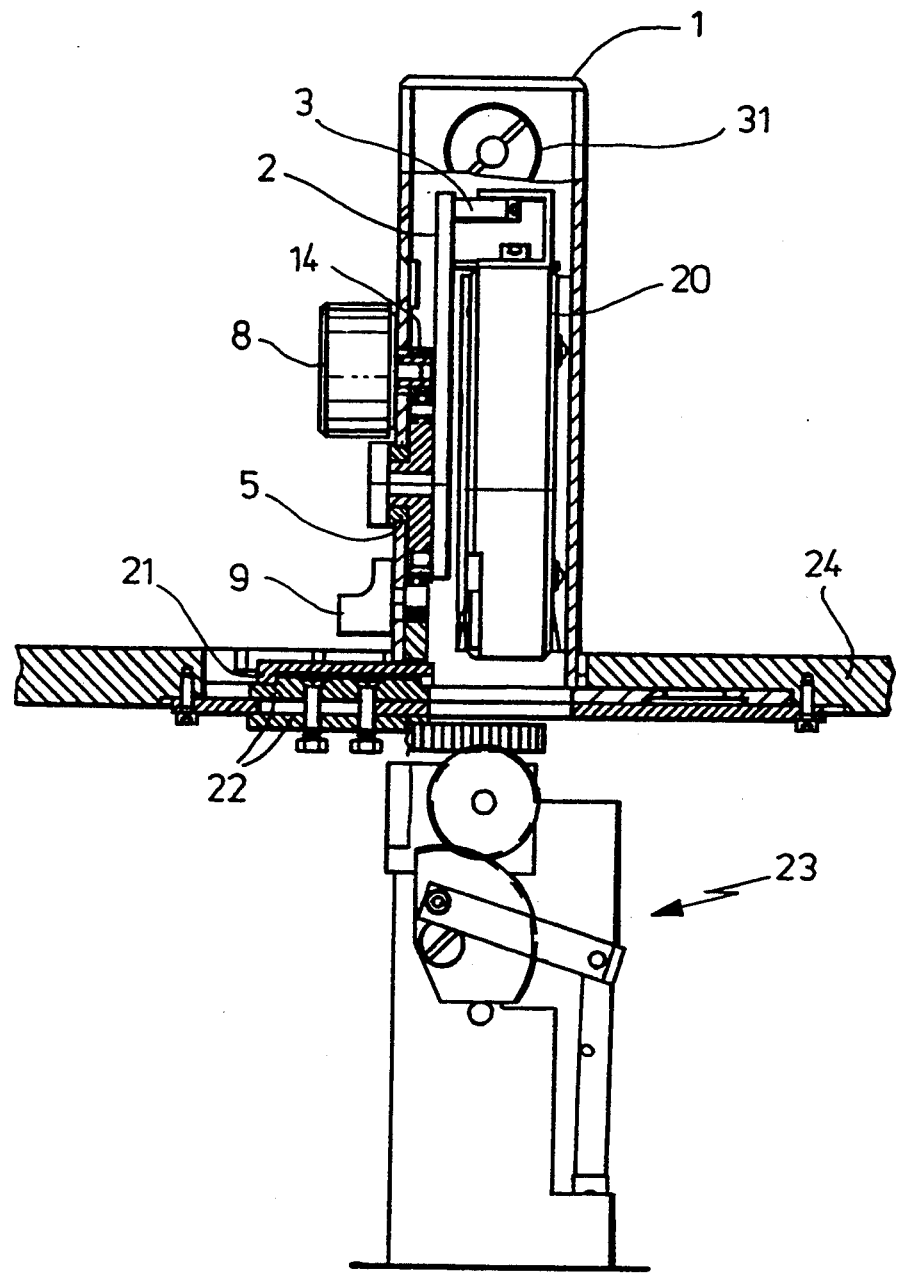
FIG. 4 shows a side view of the storage housing of FIG. 3 in which the storage housing engages a spectrometer housing.

FIG. 4 shows a side view of the storage housing 1 of FIG. 3. The housing also exhibits a desiccant storage means 31 which is adapted to contain a desiccant material which is exchangeable. In this view an optical component 20 is seen edge-on and suspended from the attachment means 3, with said attachment 3 in the position of FIG. 1 and FIG. 3. Also shown in the figure is the spectrometer housing 24 which is engaged with the storage housing 1. In this embodiment, the storage housing gate 21 and a spectrometer housing gate 22 are adapted to be mutually engaged such that the operation of the storage housing gate 21 to open the storage housing 1 also opens the spectrometer housing gate 22. The spectrometer housing gate 22 can be adapted to engage a component lock 23 which, in turn, is adapted to automatically release or lock the exchange optical component 20 into the spectrometer housing 24 upon opening and closing of the spectrometer housing gate 22 respectively.

Figure 5:
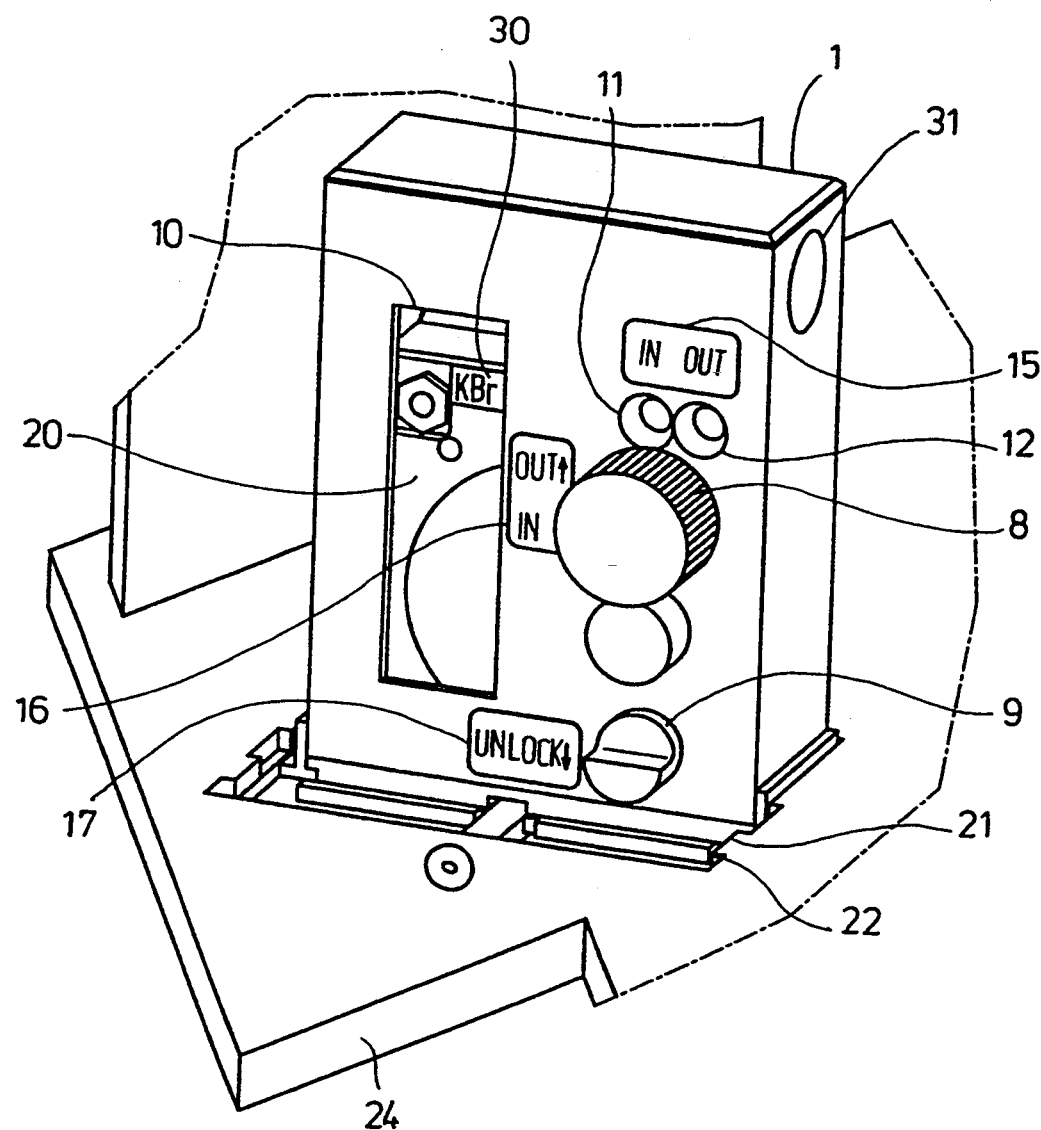
FIG. 5 shows a three-dimensional representation of the storage housing in accordance with the invention as it is being seated onto a spectrometer housing in preparation for an exchange procedure.

FIG. 5 shows a perspective 3-dimensional representation of the storage system according to the invention. In this view the optical component 20 is visible through the component window 10. The optical component 20 is equipped with a component label 30 to indicate the type of optical component 20. The spectrometer housing 24 is adapted to accept spectrometer housing gate 22 and storage housing gate 21 in mutual engagement such that an introduction of the storage housing 1 by sliding onto spectrometer housing gate 22 can also effect an opening of the storage housing 21 and spectrometer housing gates 22 so that the internal space of the storage housing 1 as well as the spectrometer housing 24 are in mutual communication. The lifting means 2 can be colored green at the attachment means 3 end so that the appearance of a green color at in-window 11 indicates that the optical component is completely located within the storage housing. Conversely, a providing of the lifting means 2 at the end opposite to the attachment means 3 with a red color results in the appearance of a red color within the out window 12 in the event that the optical component is completely removed from the storage housing and therefore within the spectrometer housing. Knob 8 can be rotated either by hand or automatically in such a fashion that, as seen by the configuration of FIG. 1 and FIG. 2, a complete clockwise rotation to the position of FIG. 1, whereby the lifting means 2 is located and abutted by the second stop 6, corresponds to the situation in which the exchange component 20 is completely removed from the spectrometer housing 24. Conversely, a complete counter clockwise rotation until the point at which the second stop 6 and the first stop 13 abut, as shown in FIG. 2, corresponds to the situation in which the optical component 20 is within the spectrometer housing 24 and outside of the storage housing 1.

The method and apparatus can be operated by hand or the system can be automated to be driven, for example, by electric motors.

We claim:

1. An apparatus for the exchange of an optical component comprising:
    a storage housing means having a lower opening, a first gate means adapted for sealing the lower opening, and a first stopping means;
    a driving means pivotably mounted to the housing means having second stopping means and a pivot means; and
    a lifting means rotatably mounted to the pivot means having attachment means at a first end, whereby a stored optical component is positioned in the housing means with the first gate means sealing the storage housing opening by hanging from the attachment means with the driving means rotated to secure the lifting means with the first and the second stopping means.

2. The apparatus of claim 1 further comprising:
    a spectrometer housing means having an upper opening and a second gate means adapted for sealing the upper opening and for engaging the first gate means; and
    a component lock means within the spectrometer housing means engaging the second gate means and adapted to lock an exchange optical component within the housing means when the second gate means seal the upper opening.

3. The apparatus of claim 2, wherein the first and the second gate means are made from a material adapted for sliding with low friction.

4. The apparatus of claim 1, wherein the storage housing means, the driving means, and the lifting means are adapted to, prior to access of an exchange optical component into the storage housing means, seal the lower opening by means of the first gate means with the driving means rotated to position one end of the lifting means in abutment with the first stopping means, whereby the lifting means hangs vertically from the pivot means.

5. The apparatus of claim 4, wherein the first lifting means end has a first color and a second lifting means end has a second color.

6. The apparatus of claim 1, wherein the storage housing means comprises a component window means adapted for enabling viewing of the stored optical component, an in-window means adapted for enabling viewing of the first end of the lifting means at an in location of the stored optical component, and an out-window means adapted for enabling viewing of the second end of the lifting means at an out location of the stored optical component.

7. The apparatus of claim 1, wherein the stored optical component is a beam-splitter for an infrared spectrometer.

8. The apparatus of claim 1 further comprising a driving means lock engaging the driving means and adapted to lock rotation of the driving means.

9. The apparatus of claim 1, wherein the storage housing means comprises a desiccant means adapted for accepting an exchangeable desiccant.

10. A method for exchanging an optical component of a spectrometer comprising:
    opening a first gate in a storage housing;
    opening a second gate in a spectrometer housing;
    unlocking a component lock to unlock an exchange optical component within the spectrometer housing;
    rotating a driving means to lower a lifting means from the storage housing into the spectrometer housing;
    further rotating the driving means to engage an attachment means on a first end of the lifting means with the exchange component to lift the component;
    further rotating the driving means to rotate the first end upwardly into the storage housing, whereby the exchange component is contained within the storage housing;
    closing the first gate to seal the storage housing; and
    closing the second gate to seal the spectrometer housing.

* * * * *